United States Patent
Blease et al.

(10) Patent No.: US 7,442,245 B2
(45) Date of Patent: Oct. 28, 2008

(54) GLYCEROL DERIVATIVES FOR INKJET INKS

(75) Inventors: James W. Blease, Avon, NY (US); Richard P. Szajewski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 38 days.

(21) Appl. No.: 11/690,271

(22) Filed: Mar. 23, 2007

(65) Prior Publication Data

US 2008/0229972 A1    Sep. 25, 2008

(51) Int. Cl.
C09D 11/00 (2006.01)
C09D 11/02 (2006.01)
B41J 2/01 (2006.01)

(52) U.S. Cl. ............ 106/31.58; 106/31.59; 106/31.86; 106/31.89; 347/100

(58) Field of Classification Search ............ 106/31.58, 106/31.59, 31.86, 31.89; 347/100
See application file for complete search history.

(56) References Cited

U.S. PATENT DOCUMENTS

| | | | | |
|---|---|---|---|---|
| 4,431,450 A | * | 2/1984 | Hasegawa et al. | 106/31.86 |
| 5,169,437 A | | 12/1992 | You | |
| 5,180,425 A | | 1/1993 | Matrick et al. | |
| 5,268,027 A | * | 12/1993 | Chan et al. | 106/31.58 |
| 5,302,197 A | * | 4/1994 | Wickramanayke et al. | 106/31.76 |
| 5,356,464 A | * | 10/1994 | Hickman et al. | 106/31.58 |
| 5,743,945 A | * | 4/1998 | Yamashita et al. | 106/31.58 |
| 6,102,998 A | * | 8/2000 | Iu et al. | 106/31.58 |
| 6,432,186 B1 | * | 8/2002 | Taniguchi | 106/31.58 |
| 6,447,592 B1 | * | 9/2002 | Taniguchi | 106/31.58 |
| 6,676,736 B2 | * | 1/2004 | Nakano et al. | 106/31.58 |
| 6,846,352 B2 | * | 1/2005 | Yatake | 106/31.58 |
| 2003/0037699 A1 | | 2/2003 | Yatake | |

* cited by examiner

*Primary Examiner*—Helene Klemanski
(74) *Attorney, Agent, or Firm*—Chris P. Konkol

(57) ABSTRACT

An ink composition for inkjet recording comprising water and a compound represented by the following Structure:

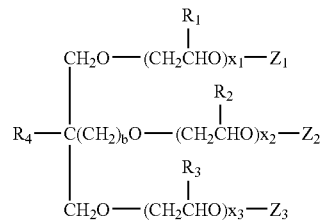

wherein at least one of $Z_1$, $Z_2$, $Z_3$, and $Z_4$ are not hydrogen; each of $R_1$, $R_2$ and $R_3$ are independently selected from the group consisting of hydrogen and methyl, $R_4$ is —H, —$CH_3$, —$C_2H_5$, or —$C_3H_7$, or —$CH_2O(CH_2CHR_5O)_{x4}Z_4$, wherein each $R_5$ is independently hydrogen or methyl; b is 0 or 1; $x_1$, $x_2$, $x_3$, and $x_4$ are each equal to at least 1, the sum of $x_1$, $x_2$, $x_3$ is 3 to 45 when $R_4$ is not —$CH_2O(CH_2CHR_5O)_{x4}Z_4$, and the sum $x_1$, $x_2$, $x_3$, and $x_4$ is from 3 to 60 when $R_4$ is —$CH_2O(CH_2CHR_5O)_{x4}Z_4$. Such compounds have been found to provide improved curl control.

12 Claims, No Drawings

GLYCEROL DERIVATIVES FOR INKJET INKS

FIELD OF THE INVENTION

The invention relates generally to the field of inks, and in particular to inks for inkjet printing. More specifically, the invention relates to colored inkjet inks having excellent jetting properties from an inkjet printhead, that result in high density, good image quality and low substrate curl when printed to an image receiving element.

BACKGROUND OF THE INVENTION

Inkjet printing is a non-impact method for producing printed images by the deposition of ink droplets in a pixel-by-pixel manner to an image-recording element in response to digital data signals. There are various methods that can be utilized to control the deposition of ink droplets on the image-recording element to yield the desired printed image. In one process, known as drop-on-demand inkjet, individual ink droplets are projected as needed onto the image-recording element to form the desired printed image. Common methods of controlling the projection of ink droplets in drop-on-demand printing include piezoelectric transducers and thermal bubble formation. In another process, known as continuous inkjet, a continuous stream of droplets is charged and deflected in an image-wise manner onto the surface of the image-recording element, while unimaged droplets are caught and returned to an ink sump. Inkjet printers have found broad applications across markets ranging from desktop document and photographic-quality imaging, to short run printing and industrial labeling.

The ink compositions known in the art of inkjet printing can be aqueous-based or solvent-based, and in a liquid, solid, or gel state at room temperature and pressure. Aqueous-based ink compositions are preferred because they are more environmentally friendly as compared to solvent-based inks, plus most printheads are designed for use with aqueous-based inks.

The ink composition can be colored with pigments, dyes, polymeric dyes, loaded-dye/latex particles, and other types of colorants, or combinations thereof. Pigment-based ink compositions are advantageously used because such inks render printed images having higher optical densities and better resistance to light and ozone as compared to printed images made from other types of colorants. The colorant in the ink composition can be yellow, magenta, cyan, black, gray, red, violet, blue, green, orange, brown, etc. Although a very numerous variety of ink compositions are known in the art of inkjet printing, several key challenges remain, especially the simultaneous achievement of various challenges in a single ink composition, in view of the tendency of many ink components to have both benefits and drawbacks. One challenge is to obtain the highest possible density on a variety of inkjet receivers.

Typically the receivers for ink compositions are categorized as a photo-quality or plain paper receivers. These two types of receivers are distinguished from one another in that the photo-quality receivers are more glossy and are manufactured with one or more coated layers above the underlying paper support. The one or more coated layers comprise at least an image-receiving layer. Typically, such photo-quality receivers can be further categorized as swellable receivers, having a non-porous polymer coating or microporous or "porous" receivers having a porous coating of particles held together with a minor amount of binder. Hybrid designs are also known. Typical swellable media are capable of very high gloss in excess of 60 gloss units at a viewing angle of 60 degrees. Typical microporous media can be designed to have gloss values approaching those of some polymer coated media and are quick to dry. The design of both plain paper and photo-quality media vary widely depending on materials and manufacturing processes.

Inkjet printing onto plain paper receivers presents an especially challenging problem, namely curl control. Photo-quality media, compared to plain paper media, can employ relatively thick backing layers to limit curl. Also, plain paper receivers are particularly susceptible to physical curling of the paper that can occur after aqueous based inks are applied and subsequently dried, because relatively large amounts of liquid ink, relative to the absorption capacity of plain paper media compared to photo-quality paper, are printed to a plain paper substrate, for example, when graphics images are printed.

Various ink additives have been disclosed in order to minimize curl of inks when applied to plain papers such as those disclosed in U.S. Pat. No. 5,356,464. However, the presence of curl reducing compounds in the ink formulation can have deleterious affects on the image density and image quality of the printed images. It is therefore a goal to have ink compositions that minimize image receiver curl while providing high image density. Furthermore, yet a third challenge for inkjet printing is the minimization of image quality artifacts related to bleed and coverage uniformity. The design of the ink components can have a significant impact on image quality artifacts, especially on certain types of receivers. Non-uniform ink coverage onto a particular ink receiver can result in both macroscopic and microscopic density fluctuations that are objectionable to the observer. Similarly, the design of ink components and the receiver can have a significant affect on ink bleed. Bleed occurs when two inks are printed adjacent to one another in close proximity and the inks mix while spreading and penetrating the receiver surface. This can have an adverse affect on color properties and sharpness of the final image. It is therefore a goal of ink compositions to minimize bleed and to have high coverage uniformity on a particular, and more preferably across a wide variety of, image receivers, while simultaneously reducing image receiver curl and providing high image density.

Ethoxylated glycerol compounds, and classes of compounds encompassing such compounds, have conventionally been used as humectants or the like in inkjet inks as disclosed in U.S. Pat. Nos. 5,169,437; 5,180,425; and U.S. Patent Publication No. 2003/0037699. Such compounds can be made from reacting glycerol or the like with alkylene oxide units. For example, U.S. Pat. No. 5,169,437 discloses the use of compounds having a certain structural formula, in which structural formula alkylene oxide chains are attached to a glycerol backbone, which compounds are used as a humectant to mitigate the problems arising with the crusting and clogging of orifice plates in thermal inkjet printers. The compounds were found to reduce the rate of evaporation of an aqueous ink composition. U.S. Pat. No. 5,180,425 to Matrick et al. discloses the use of compounds having a similar structural formula, in which structural formula alkylene oxide chains are attached to a backbone derived from a polyol having 3 or more hydroxyl groups such as glycerol, trimethylol propane, or the like, which compounds are used as a co-solvent to prevent film formation on resistor surfaces while maintaining stable pigment dispersions free from premature nozzle plugging. U.S. Patent Publication No. 2003/0037699 to Yatake discloses the use of compounds having a certain structural formula, in which structural formula both ethyleneoxy and propyleneoxy groups randomly or as blocks joined together to form alkylene oxide chains are attached to a glycerol backbone, which compounds are used as a humectant to provide an ink composition with excellent ejection stability, which ink composition further comprises glycerin and optionally further 1,2-alkylene glycol or di(tri)ethylene monobutyl ether.

PROBLEM TO BE SOLVED BY THE INVENTION

Ink compositions of the present invention provide high image density, high coverage uniformity, low bleed and low receiver curl for use in inkjet printing.

SUMMARY OF THE INVENTION

The present invention is directed to overcoming one or more of the problems set forth above. Briefly summarized, according to one aspect of the present invention, there is provided an ink composition for inkjet recording, comprising water and a compound represented by Structure (I):

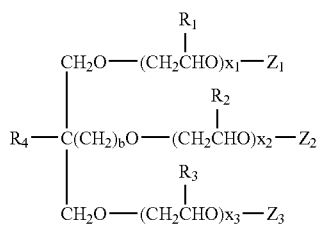

(I)

wherein at least one of the $Z_1$, $Z_2$, $Z_3$, and $Z_4$ is neither hydrogen nor comprises a terminal hydroxy group from another alkylene oxide repeat unit; each $R_1$, $R_2$ and $R_3$ (that is, each one of $R_1$, each one of $R_2$, and each one of $R_3$) is independently selected from the group consisting of hydrogen and methyl; $R_4$ is —H, alkyl having 1 to 3 carbon atoms (—CH$_3$, —C$_2$H$_5$, or —C$_3$H$_7$), or —CH$_2$O(CH$_2$CHR$_5$O)$_{x4}$Z$_4$, wherein each $R_5$ is independently hydrogen or methyl; b is 0 or 1; $x_1$, $x_2$, $x_3$, and (if present) $x_4$ are each equal to at least 1, the sum of $x_1$, $x_2$, $x_3$ is 3 to 45 when $R_4$ is not —CH$_2$O (CH$_2$CHR$_5$O)$_{x4}$Z$_4$, and the sum $x_1$, $x_2$, $x_3$, $x_4$ is from 3 to 60 when $R_4$ is —CH$_2$O(CH$_2$CHR$_5$O)$_{x4}$Z$_4$. Preferably at least two, more preferably at least three, most preferably all of the $Z_1$, $Z_2$, $Z_3$, and (if present) $Z_4$ are neither hydrogen nor comprise a hydroxy group, for example, another alkylene oxide repeat unit comprising a terminal hydroxy group). More preferably, all of the $Z_1$, $Z_2$, $Z_3$, and (if present) $Z_4$ are an acetyl, ester, or methyl group having 1 to 6 carbon atoms.

In a preferred embodiment, the $Z_1$, $Z_2$, $Z_3$, and $Z_4$ are hydrophobic substituents comprising at least one carbon atom and no hydroxy groups. For example, in one such embodiment, $Z_1$, $Z_2$, $Z_3$, and $Z_4$ are each independently selected from $R_6$, COR$_6$, CONR$_6$R$_7$, and COOR$_6$, where $R_6$ is a substituted or unsubstituted alkyl group having 1 to 6 carbon atoms (preferably 1 to 3 carbon atoms), an optionally substituted phenyl group, or an optionally substituted alkyl-aryl group having 6 to 10 carbon atoms, and $R_7$ is —H or $R_6$.

DETAILED DESCRIPTION OF THE INVENTION

Ink compositions of the present invention are aqueous-based. By aqueous-based, it is meant that the majority of the liquid components in the ink composition are water, preferably greater than 50% water and more preferably greater than 60% water. The inventive inks comprise water and a substituted alkoxylated glycerol compound of the above Structure (I).

A preferred class of compounds is represented by the following Structure (I-A):

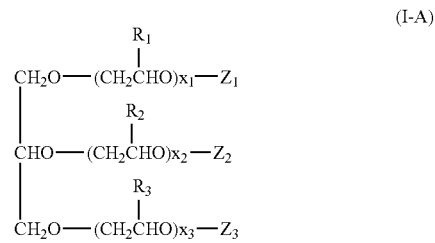

(I-A)

wherein at least two of the $Z_1$, $Z_2$, and $Z_3$, preferably all three, are neither hydrogen nor comprise a terminal hydroxy group from another alkylene oxide repeat unit. Preferably, the $Z_1$, $Z_2$, and $Z_3$ are hydrophobic substituents comprising at least one carbon atom and no hydroxy groups and wherein $R_1$, $R_2$ and $R_3$ are each independently selected from hydrogen or methyl, $x_1$, $x_2$ and $x_3$ are each independently greater than or equal to one, and the sum of $x_1$, $x_2$ and $x_3$ is from 3 to 45. In a preferred embodiment, $Z_1$, $Z_2$ and $Z_3$ are each independently selected from $R_6$, COR$_6$, CONR$_6$R$_7$, and COOR$_6$, where $R_6$ is a substituted or unsubstituted alkyl group having 1 to 6 carbon atoms, an optionally substituted phenyl group, or an optionally substituted alkyl-aryl group having 6 to 10 carbon atoms, and $R_7$ is —H or $R_6$. A preferred optional substituent for an alkyl group is fluorine. Preferably the compound of Structure I is completely water-soluble in use. In one particular embodiment of Structure I-A, $R_1$, $R_2$ and $R_3$ are all hydrogen.

Unless otherwise specifically stated, use of the term "substituted" or "substituent" means any group or atom other than hydrogen. Additionally, when the term "group" is used, it means that when a substituent group contains a substitutable hydrogen, it is also intended to encompass not only the substituents unsubstituted form, but also its form to the extent it can be further substituted (up to the maximum possible number) with any other mentioned substituent group or groups (mentioned for the same position) so long as the substituent does not destroy properties necessary for utility in an inkjet ink. If desired, the substituents may themselves be further substituted one or more times with acceptable substituent groups. For example, an alkyl group can be substituted with an alkoxy group or one or more fluorine atoms. Examples of any of the above-mentioned alkyl groups, except as otherwise indicated, are methyl, ethyl, propyl, isopropyl, butyl, isobutyl, t-butyl, pentyl, hexyl, octyl, 2-ethylhexyl, and congeners. Alkyl groups, preferably having 1 to 6 carbon atoms, more preferably 1 to 4, are intended to include branched or linear groups.

In a preferred embodiment of Structure I-A above, each of the $R_1$, $R_2$ and $R_3$ are hydrogen, and the sum of $x_1$, $x_2$ and $x_3$ is a number from 3 to 45, more preferably from 6 to 30 and most preferably from 9 to 24. In a preferred embodiment, with respect to each of the Structures herein, each of $x_1$, $x_2$, and $x_3$ is from 5 to 10, preferably about 7. Compounds having a degree of alkoxylation where the sum of $x_1$, $x_2$ and $x_3$ is between about 3 and 24 have a minimal impact on ink viscosity.

Yet another preferred class of compounds, according to Structure I above, is a compound represented by Structure I-B:

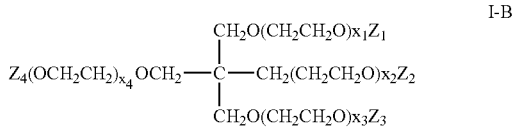

Such compounds are ethoxylated/propoxylated pentaerythritols in which the $Z_1$, $Z_2$, $Z_3$, and $Z_4$ groups are as defined above, preferably an acetyl, ester, or methyl group.

Compounds of the present invention are commercially available from various companies such as Lipo Chemicals Co. (Paterson, N.J.), Henkel Corporation (Ambler, Pa.), Dow Chemical Co. (Midland, Mich.), Witco Corp. (NY, N.Y.), and Phoenix Chemical, Inc. (Somerville, N.J.). Alternatively, such compounds can be made, for example, by reacting a polyol with an ethylene and/or propylene oxide, as will be understood by the skilled chemist. Reaction with alkylene oxide can produce mixtures of compounds with varying degrees of oxyalkylation so that the structures illustrated are based on average compositions which may contain a range of alkylene oxide units. Random and block copolymer chains or propylene and ethylene oxides may be employed. Useful polyols include, but are not limited to, for example, glycerol, trimethylol propane, trimethylol ethane, and pentaerythritol.

In one particular example of a compound according to Structure I-A above, $Z_1$, $Z_2$ and $Z_3$ are each independently selected from methyl or acetyl. An example of one such preferred embodiment is glycereth-7 trimethyl ether, where the average of $x_1$, $x_2$ and $x_3$ is about seven (i.e., the sum of $x_1$, $x_2$ and $x_3$ is about 21), available commercially as COSCAP G7-MC from Phoenix Chemical, Incorporated, as illustrated by the following Structure (I-C):

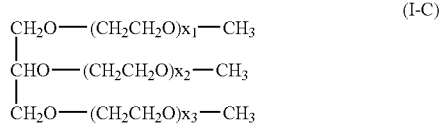

Another particular example of the present invention is the compound glyceryth-7 triacetate, where the average of $x_1$, $x_2$ and $x_3$ is about seven (i.e., the sum of $x_1$, $x_2$ and $x_3$ is about 21), available commercially as PELEMOL G7A from Phoenix Chemical, Incorporated, as illustrated by the following Structure (I-D):

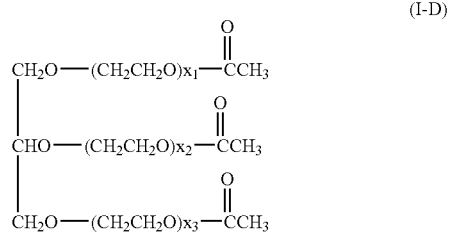

The alkoxylated polyol compounds of the present invention can be used in the ink composition at ranges of from about 0.1 to about 30 weight percent based on the total weight of all the ink components, more preferably from about 0.5 to about 20% and most preferably from about 1 to about 16%. Use of mixtures of compounds according to Structure (I) in the same inkjet ink is specifically contemplated.

The water compositions useful in the invention can also include humectants and/or co-solvents in order to prevent the ink composition from drying out or crusting in the nozzles of the printhead, aid solubility of the components in the ink composition, or facilitate penetration of the ink composition into the image-recording element after printing. Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, polyethylene glycol, polypropylene glycol, 1,2-propane diol, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol, glycerol, 1,2,6-hexanetriol, 2-ethyl-2-hydroxymethyl-propane diol, saccharides and sugar alcohols and thioglycol; (3) lower mono- and di-alkyl ethers derived from the polyhydric alcohols; such as, ethylene glycol monomethyl ether, ethylene glycol monobutyl ether, ethylene glycol monoethyl ether acetate, diethylene glycol monomethyl ether, and diethylene glycol monobutyl ether acetate (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanol, dimethyl sulfoxide and tetramethylene sulfone.

The ink composition can be colored with pigments, dyes, polymeric dyes, loaded-dye/latex particles, or any other types of colorants, or combinations thereof. Pigment-based ink compositions can be advantageously used because such inks render printed images having higher optical densities and better resistance to light and ozone as compared to printed images made from other types of colorants. The ink composition can be yellow, magenta, cyan, black, gray, red, violet, blue, green, orange, brown, etc.

A wide variety of organic and inorganic pigments, alone or in combination with additional pigments or dyes, can be used in the ink composition of the present invention. Pigments that can be used in the invention include those disclosed in, for example, U.S. Pat. Nos. 5,026,427; 5,086,698; 5,141,556; 5,160,370; and 5,169,436. The exact choice of pigments will depend upon the specific application and performance requirements such as color reproduction and image stability.

Pigments suitable for use in the invention include, but are not limited to, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that can be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I, Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42.

Self-dispersing pigments that are dispersible without the use of a dispersant or surfactant can also be useful in the invention. Pigments of this type are those that have been subjected to a surface treatment such as oxidation/reduction, acid/base treatment, or functionalization through coupling chemistry. The surface treatment can render the surface of the pigment with anionic, cationic or non-ionic groups. Examples of self-dispersing type pigments include CAB-O-Jet 200 and CAB-O-Jet 300 (Cabot Specialty Chemicals, Inc.) and BONJET CW-1, CW-2 and CW-3 (Orient Chemical Industries, Ltd.).

Aqueous pigment-based ink compositions of the invention may also contain self-dispersed colorants in which the surfaces of pigment particles are chemically functionalized such that a separate dispersant is not necessary, See, for example, U.S. Pat. No. 6,494,943 B1 and U.S. Pat. No. 5,837,045.

Pigment-based ink compositions useful in the invention can be prepared by any method known in the art of inkjet printing. Useful methods commonly involve two steps: (a) a dispersing or milling step to break up the pigments to primary particles, where primary particle is defined as the smallest identifiable subdivision in a particulate system, and (b) a dilution step in which the pigment dispersion from step (a) is diluted with the remaining ink components to give a working strength ink.

The milling step (a) can be carried out using any type of grinding mill such as a media mill, a ball mill, a two-roll mill, a three-roll mill, a bead mill, and air-jet mill, an attritor, or a liquid interaction chamber. In the milling step (a), pigments are optionally suspended in a medium which is typically the same as or similar to the medium used to dilute the pigment dispersion in step (b). Inert milling media are optionally present in the milling step (a) in order to facilitate break up of the pigments to primary particles. Inert milling media include such materials as polymeric beads, glasses, ceramics, metals and plastics as described, for example, in U.S. Pat. No. 5,891, 231. Milling media are removed from either the pigment dispersion obtained in step (a) or from the ink composition obtained in step (b).

A dispersant is optionally present in the milling step (a) in order to facilitate break up of the pigments into primary particles. For the pigment dispersion obtained in step (a) or the ink composition obtained in step (b), a dispersant is optionally present in order to maintain particle stability and prevent settling. Dispersants suitable for use in the invention include, but are not limited to, those commonly used in the art of inkjet printing. For aqueous pigment-based ink compositions, useful dispersants include anionic, cationic or nonionic surfactants such as sodium dodecylsulfate, or potassium or sodium oleylmethyltaurate as described in, for example, U.S. Pat. No. 5,679,138; 5,651,813; or 5,985,017.

Polymeric dispersants are also known and useful in aqueous pigment-based ink compositions. Polymeric dispersants can be added to the pigment dispersion prior to, or during the milling step (a), and include polymers such as homopolymers and copolymers; anionic, cationic or nonionic polymers; or random, block, branched or graft polymers. Polymeric dispersants useful in the milling operation include random and block copolymers having hydrophilic and hydrophobic portions; see for example, U.S. Pat. No. 4,597,794; 5,085,698; 5,519,085; 5,272,201; 5,172,133; or 6,043,297; and graft copolymers; see for example, U.S. Pat. No. 5,231,131; 6,087, 416; 5,719,204; or 5,714,538.

Composite colorant particles having a colorant phase and a polymer phase are also useful in aqueous pigment-based inks of the invention. Composite colorant particles are formed by polymerizing monomers in the presence of pigments; see for example, U.S. Ser. Nos. 10/446,013; 10/446,059; or 10/665, 960. Microencapsulated-type pigment particles are also useful and consist of pigment particles coated with a resin film; see for example U.S. Pat. No. 6,074,467.

Dyes suitable for use in the invention include, but are not limited to, those commonly used in the art of inkjet printing. For aqueous-based ink compositions, such dyes include water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like. Specific examples of dyes usable in the present invention are as follows; yellow dyes including: C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165; C.I. Direct Yellow 1, 8, 11, 12, 24, 26, 27, 33, 39, 44, 50, 58, 85, 86, 87, 88, 89, 98, 110, 132, 142, and 144; C.I. Reactive Yellow 1, 2, 3, 4, 6, 7, 11, 12, 13, 14, 15, 16, 17, 18, 22, 23, 24, 25, 26, 27, 37, and 42; and C.I. Food Yellow 3 and 4; magenta dyes including: C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64; and C.I. Food Red 7, 9, and 14; cyan dyes including; C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249; C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46; and C. I. Food Blue 1 and 2; black dyes including: C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, and 191; C.I.

Direct Black 17, 19, 22, 32, 39, 51, 56, 62, 71, 74, 75, 77, 94, 105, 106, 107, 108, 112, 113, 117, 118, 132, 133, 146, 154, and 168; C.I. Reactive Black 1, 3, 4, 5, 6, 8, 9, 10, 12, 13, 14, 31, and 18; and C.I. Food Black 2, CAS No. 224628-70-0 sold as JPD Magenta EK-1 Liquid from Nippon Kayaku Kabushiki Kaisha; CAS No. 153204-88-7 sold as INTRAJET Magenta KRP from Crompton and Knowles Colors; the metal azo dyes disclosed in U.S. Pat. Nos. 5,997,622 and 6,001,161.

Also useful in the invention are polymeric dyes or loaded-dye/latex particles. Examples of polymeric dyes are described in U.S. Pat. No. 6,457,822 B1 and references therein. Examples of loaded-dye/latex particles are described in U.S. Pat. No. 6,431,700 B1 and U.S. Ser. Nos. 10/393,235; 10/393,061; 10/264,740; 10/020,694; and 10/017,729.

The colorants used in the ink composition of the invention may be present in any effective amount, generally from 0.1 to 10% by weight, and preferably from 0.5 to 6% by weight.

Inkjet ink compositions can also contain non-colored particles such as inorganic particles or polymeric particles. The use of such particulate addenda has increased over the past several years, especially in inkjet ink compositions intended for photographic-quality imaging. For example, U.S. Pat. No. 5,925,178 describes the use of inorganic particles in pigment-based inks in order to improve optical density and rub resistance of the pigment particles on the image-recording element. In another example, U.S. Pat. No. 6,508,548 B2 describes the use of a water-dispersible polymeric latex in dye-based inks in order to improve light and ozone resistance of the printed images.

The ink composition can contain non-colored particles such as inorganic or polymeric particles in order to improve gloss differential, light and/or ozone resistance, waterfastness, rub resistance and various other properties of a printed image. See, for example, U.S. Pat. No. 6,598,967 B1 or U.S. Pat. No. 6,508,548 B2. Colorless ink compositions that contain non-colored particles and no colorant can also be used. Colorless ink compositions are often used in the art as "fixers" or insolubilizing fluids that are printed under, over, or with colored ink compositions in order to reduce bleed between colors and waterfastness on plain paper; see for example, U.S. Pat. No. 5,866,638 or U.S. Pat. No. 6,450,632 B1. Colorless inks are also used to provide an overcoat to a printed image, usually in order to improve scratch resistance and waterfastness; see for example, U.S. Patent Publication No. 2003/0009547 A1 or E.P. 1,022,151 A1. Colorless inks are also used to reduce gloss differential in a printed image; see for example, U.S. Pat. No. 6,604,819 B2; and U.S. Patent Publication Nos. 2003/0085974 A1; 2003/0193553 A1; or 2003/0189626 A1.

Examples of inorganic particles useful in the invention include, but are not limited to, alumina, boehmite, clay, calcium carbonate, titanium dioxide, calcined clay, aluminosilicates, silica, or barium sulfate.

For aqueous-based inks, polymeric particles useful in the invention include water-dispersible polymers generally classified as either addition polymers or condensation polymers, both of which are well-known to those skilled in the art of polymer chemistry. Examples of polymer classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric, film-forming, non-film-forming, fusible, or heavily cross-linked and can have a wide range of molecular weights and glass transition temperatures.

Examples of useful polymeric particles are styrene-acrylic copolymers sold under the trade names JONCRYL (S.C. Johnson Co.), Ucar™ (Dow Chemical Co.), JONREZ (MeadWestvaco Corp.), and VANCRYL (Air Products and Chemicals, Inc.); sulfonated polyesters sold under the trade name Eastman AQ (Eastman Chemical Co.); polyethylene or polypropylene resin emulsions and polyurethanes (such as the WITCOBONDS from Witco). These polymeric particles are preferred because they are compatible in typical aqueous-based ink compositions, and because they render printed images that are highly durable towards physical abrasion, light and ozone.

The non-colored particles used in the ink composition of the invention can be present in any effective amount, generally from 0.01 to 20% by weight, and preferably from 0.01 to 6% by weight. The exact choice of non-colored particles will depend upon the specific application and performance requirements of the printed image.

Ink compositions can also contain water-soluble polymers often referred to as resins or binders in the art of inkjet ink compositions. The water-soluble polymers useful in the ink composition are differentiated from polymer particles in that they are soluble in the water phase or combined water/water-soluble solvent phase of the ink. Included in this class of polymers are nonionic, anionic, amphoteric and cationic polymers. Representative examples of water soluble polymers include, polyvinyl alcohols, polyvinyl acetates, polyvinyl pyrrolidones, carboxy methyl cellulose, polyethyloxazolines, polyethyleneimines, polyamides and alkali soluble resins; polyurethanes (such as those found in U.S. Pat. No. 6,268,101), polyacrylic acids, styrene-acrylic methacrylic acid copolymers (such as; as JONCRYL 70 from S.C. Johnson Co., TRUDOT IJ-4655 from MeadWestvaco Corp., and VANCRYL 68S from Air Products and Chemicals, Inc.

Surfactants can be added to adjust the surface tension of the ink to an appropriate level. The surfactants can be anionic, cationic, amphoteric or nonionic and used at levels of 0.01 to 5% of the ink composition. Examples of suitable nonionic surfactants include, linear or secondary alcohol ethoxylates (such as the TERGITOL 15-S and TERGITOL TMN series surfactants available from Union Carbide and the BRIJ series of surfactants from Uniquema), ethoxylated alkyl phenols (such as the TRITON series of surfactants from Union Carbide), fluoro surfactants (such as the ZONYL surfactants from DuPont; and the FLUORAD surfactants from 3M), fatty acid ethoxylates, fatty amide ethoxylates, ethoxylated and propoxylated block copolymers (such as the PLURONIC and TETRONIC series of surfactants from BASF, ethoxylated and propoxylated silicone based surfactants (such as the SIL-WET series of surfactants from CK Witco), alkyl polyglycosides (such as the GLUCOPON surfactants from Cognis) and acetylenic polyethylene oxide surfactants (such as the SURFYNOL surfactants from Air Products).

Examples of anionic surfactants include; carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates and alkyl naphthalene sulfonates), phosphated (such as phosphated esters of alkyl and aryl alcohols, including the STRODEX series of surfactants from Dexter Chemical), phosphonated and amine oxide surfactants and anionic fluorinated surfactants. Examples of amphoteric surfactants include: betaines, sultaines, and aminopropionates. Examples of cationic surfactants include; quaternary ammonium compounds, cationic amine oxides, ethoxylated fatty amines and imidazoline surfactants. Additional examples are of the above surfactants are described in "McCutcheon's Emulsifiers and Detergents: 1995, North American Editor".

A biocide can be added to an inkjet ink composition to suppress the growth of micro-organisms such as molds, fungi, etc. in aqueous inks. A preferred biocide for an ink composition is PROXEL GXL biocide (Zeneca Specialties Co.) at a final concentration of 0.0001-0.5 wt. %. Additional additives which can optionally be present in an inkjet ink composition include thickeners, conductivity enhancing agents, anti-kogation agents, drying agents, waterfast agents, dye solibilizers, chelating agents, binders, light stabilizers, viscosifiers, buffering agents, anti-mold agents, anti-curl agents, stabilizers and defoamers.

The pH of the aqueous ink compositions of the invention may be adjusted by the addition of organic or inorganic acids or bases. Useful inks may have a preferred pH of from about 2 to 10, depending upon the type of dye or pigment being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

The exact choice of ink components will depend upon the specific application and performance requirements of the printhead from which they are jetted. Thermal and piezoelectric drop-on-demand printheads and continuous printheads each require ink compositions with a different set of physical properties in order to achieve reliable and accurate jetting of the ink, as is well known in the art of inkjet printing. Acceptable viscosities are no greater than 20 cP, and preferably in the range of about 1.0 to 6.0 cP. Acceptable surface tensions are no greater than 60 dynes/cm, and preferably in the range of 28 dynes/cm to 45 dynes/cm.

Another aspect of the present invention relates to an inkjet printing process, comprising the steps of:

(A) providing an inkjet printer that is responsive to digital data signals;

(B) loading the printer with an inkjet recording element;

(C) loading the printer with an inkjet ink composition as described above; and (D) printing on the inkjet recording element using the inkjet ink composition in response to the digital data signals, wherein droplets of the inkjet ink composition are ejected and deposited onto the inkjet recording element.

In one embodiment, the inkjet printing process provides a curl of less than 30, whereas the same inkjet ink composition replaced by glycerol provides a curl of greater than 40, according to the curl test used in the Examples below.

The following examples are provided to illustrate, but not to limit, the invention.

EXAMPLES

In order to demonstrate the beneficial effect of the ink components of the invention, the inkjet inks shown in Table 1 were prepared by simple mixing of the component ingredients. Each ink in Table 1 contains 16.0 g of self-dispersed carbon black dispersion CABOT IJX-597 available from Cabot Corporation. The carbon black dispersion comprises about 15% solid carbon black pigment. The inks in table 1 also contain 34.4 grams of high purity filtered water.

TABLE 1

| Ink example number | Ink additive | Ink additive amount (grams) |
| --- | --- | --- |
| 1 | glycereth-7 methoxide[1] | 9.6 |
| 2 | glycereth-7 triacetate[2] | 9.6 |

[1]Available as COSCAP G7-MC from Phoenix Chemical, Inc.
[2]Available as PELEMOL G7A from Phoenix Chemical, Inc.

As comparative examples, the inks in table 2 were prepared. As with the inventive inks described in Table 1, each ink of the comparative examples contain 16.0 g of CABOT IJX-597 carbon black dispersion and 34.4 g of high purity filtered water.

TABLE 2

| Ink comparative example number | Ink additive | Ink additive amount (grams) |
| --- | --- | --- |
| 1 | Glycerol | 9.6 |
| 2 | glycereth-7[3] | 9.6 |
| 3 | triacetin | 9.6 |
| 4 | water | 9.6 |

[3]Available as Liponic EG-1 from Lipo Chemical

Glycerol has the following chemical structure:

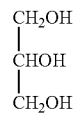

Glycereth-7 has the following structure;

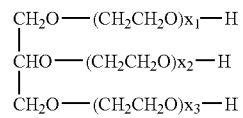

wherein $x_1$, $x_2$ and $x_3$ sum to about 21; and

Triacetin has the following structure:

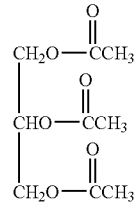

In order to evaluate the performance of each example ink of the invention and the comparative example inks, the inks were individually placed in separate black ink cartridges and printed using CANON model i960 inkjet printer. The following tests one through four were performed on the example inks of the invention and the comparative inks:

Maximum Print Density

A one centimeter square area was printed using the inks of the invention and comparative inks at the maximum single ink coverage allowed by the printer. Print testing was done on the following 20 lb plain paper types: Georgia Pacific SPECTRUM Inkjet Paper; HAMMERMILL FORE MP Multipurpose Paper; and HEWLETT PACKARD Multipurpose Paper.

The printed area was allowed to dry approximately 24 hours. The Status A reflection optical density was then read under D50 illumination using a SPECTROLINO densitometer. It is desired that the average print density across the variety of plain papers should be at least 1.25.

Coverage Uniformity

To evaluate the quality of the maximum print density, the coverage uniformity of the printed area was evaluated and rated. Printed area described as poor for coverage uniformity showed a high level of mottle. Mottle is described here as printed density variation over a small spatial distance, typically a few millimeters. Printed areas described as good for coverage uniformity were very nearly free of any non-uniformity or mottle. A print area rating of fair or better is desired.

Ink Bleed

The area printed with the inks of the invention and comparative example inks was evaluated on a variety of plain paper media for the degree to which the inks bled into adjoining areas on the plain papers as evaluated for black text printed with a yellow ink background. A very good bleed result was characterized by very little migration of black color into the yellow printed areas. Poor bleed was characterized by a high level of ink bleed such that the resulting print quality would be deemed generally unacceptable. The bleed evaluation here includes both the phenomena of line-spread, and the phenomena of wicking along paper fibers. A bleed rating of fair or better is desired in this test.

Paper Curl

To evaluate paper curl effects a ca 1.25 ml per square foot coverage rectangular patch measuring about 5 by 9 inches was printed onto an 8.5 by 11 inch paper sheet sample with the long axis of the paper and the long axis of the patch aligned. The printed patch was offset by 0.5 inch in each direction from one corner of the paper sheet. The paper was immediately allowed to assume whatever natural shape occurs as a result of the ink formulation's interaction with the plain paper. In order to assure consistent results the temperature and relative humidity are held at 70° F. and 20% RH for the test. These low humidity conditions tend to exacerbate plain paper curl.

Curl is measured at specific time intervals after the printed sheet was removed from the printer. The angle formed by the lead edge of the paper, and the surface on which the paper rests provides a quantitative measure of curl. A full circle formed in the paper after printing is considered to give a curl value of 360 degrees. A curl test run about 48 hours after printing that results in a curl value of 30 degrees or less is most desirable, although values of less than 90 degrees are generally acceptable.

The test results for examples on inventive inks 1 and 2 and comparative inks C1 to C4 are shown in Table 4.

TABLE 4

| Ink ID | Average density | Coverage uniformity | bleed | 48 hour curl (degrees) |
|---|---|---|---|---|
| Ex. 1 | 1.349 | Fair | good | 5 |
| Ex. 2 | 1.268 | Good | good | 25 |
| C1 | 1.275 | Very poor | very poor | 47 |
| C2 | 1.238 | Fair | poor | 20 |
| C3 | 1.286 | Fair | very good | 130 |
| C4 | 1.186 | Poor | poor | 210 |

Inspection of Table 4 shows that only the inks of the invention provide good performance for the ink tests, including simultaneous consideration of bleed, curl, and density.

The invention has been described with reference to a preferred embodiment. However, it will be appreciated that variations and modifications can be effected by a person of ordinary skill in the art without departing from the scope of the invention.

What is claimed is:

1. An ink composition for inkjet recording, comprising water and a compound represented by the following Structure:

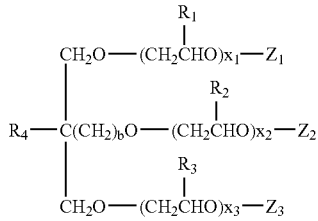

wherein at least one of $Z_1$, $Z_2$, $Z_3$, and $Z_4$ is neither hydrogen nor comprises a terminal hydroxy group from an alkylene oxide repeat unit; each of $R_1$, $R_2$ and $R_3$ are independently selected from the group consisting of hydrogen and methyl, $R_4$ is —H, —$CH_3$, —$C_2H_5$, or —$C_3H_7$, or —$CH_2O(CH_2CHR_5O)_{x4}Z_4$, wherein each $R_5$ is independently hydrogen or methyl; b is 0 or 1; $x_1$, $x_2$, $x_3$, and $x_4$ are each equal to at least 1, the sum of $x_1$, $x_2$, $x_3$ is 3 to 45 when $R_4$ is not —$CH_2O(CH_2CHR_5O)_{x4}Z_4$, and the sum $x_1$, $x_2$, $x_3$, and $x_4$ is from 3 to 60 when $R_4$ is —$CH_2O(CH_2CHR_5O)_{x4}Z_4$.

2. The ink composition of claim 1 wherein the compound is represented by the following Structure:

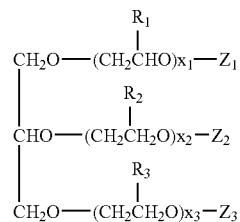

wherein $Z_1$, $Z_2$, and $Z_3$ are hydrophobic substituents comprising at least one carbon atom and no hydroxy groups; each of $R_1$, $R_2$ and $R_3$ are independently selected from hydrogen or methyl, $x_1$, $x_2$ and $x_3$ are each independently numbers greater than or equal to one, and the sum of $x_1$, $x_2$ and $x_3$ is from 3 to 45.

3. The ink composition of claim 1 wherein $Z_1$, $Z_2$, $Z_3$, and $Z_4$ independently are selected from the group consisting of alkyl, ester, amide, and fluoroalkyl.

4. The ink composition according to claim 1 further comprising one or more colorants.

5. The ink composition according to claim 2 wherein $R_1$, $R_2$ and $R_3$ are hydrogen, the sum of $x_1$, $x_2$ and $x_3$ is from 6 to 30 and $Z_1$, $Z_2$ and $Z_3$ are selected from alkyl or ester groups.

6. The ink composition according to claim 1 wherein the compound is represented by the following Structure:

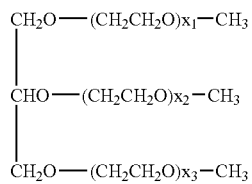

wherein the sum of $x_1+x_2+x_3$ is from 9 to 24.

7. The ink composition according to claim 1 wherein the compound is represented by the following Structure:

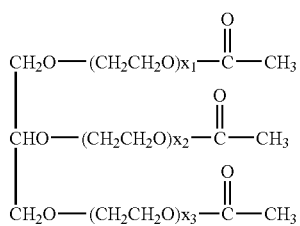

wherein the sum of $x_1+x_2+x_3$ is from 9 to 24.

8. The ink composition according to claim 1 wherein the compound represented by the Structure is about 2 weight percent to about 25 weight percent in the ink composition.

9. The ink composition according to claim 1 further comprising one or more surfactants.

10. An inkjet printing process, comprising the steps of:
    (A) providing an inkjet printer that is responsive to digital data signals;
    (B) loading the printer with an inkjet recording element;
    (C) loading the printer with an inkjet ink composition of claim 1; and
    (D) printing on the inkjet recording element using the inkjet ink composition in response to the digital data signals, wherein droplets of the inkjet ink composition are ejected and deposited onto the inkjet recording element.

11. The inkjet printing process of claim 10 wherein the inkjet recording element is plain paper.

12. The inkjet printing process of claim 11 wherein the inkjet ink composition provides a curl of less than provided by an otherwise equivalent or identical inkjet ink composition containing an equal weight of glycerol in place of the compound of claim 1.

* * * * *